(12) United States Patent
Breidenstein et al.

(10) Patent No.: US 8,239,829 B2
(45) Date of Patent: Aug. 7, 2012

(54) USER CO-ROUTINE INTERFACE FOR CUSTOMIZING SIP AND SDP PROTOCOLS

(75) Inventors: Charles J. Breidenstein, West Seneca, NY (US); James W. Delmege, North Chili, NY (US)

(73) Assignee: Redcom Laboratories, Inc., Victor, NY (US)

( * ) Notice: Subject to any disclaimer, the term of this patent is extended or adjusted under 35 U.S.C. 154(b) by 1002 days.

(21) Appl. No.: 12/188,347

(22) Filed: Aug. 8, 2008

(65) Prior Publication Data
US 2009/0043996 A1    Feb. 12, 2009

Related U.S. Application Data

(60) Provisional application No. 60/964,027, filed on Aug. 8, 2007.

(51) Int. Cl.
*G06F 9/44* (2006.01)
*G06F 9/46* (2006.01)

(52) U.S. Cl. ........ 717/120; 717/106; 717/121; 717/139; 718/107; 718/108

(58) Field of Classification Search .................. None
See application file for complete search history.

(56) References Cited

U.S. PATENT DOCUMENTS

| | | | | |
|---|---|---|---|---|
| 5,581,778 A | * | 12/1996 | Chin et al. | 712/16 |
| 5,889,988 A | * | 3/1999 | Held | 718/103 |
| 5,903,752 A | * | 5/1999 | Dingwall et al. | 718/103 |
| 6,317,872 B1 | * | 11/2001 | Gee et al. | 717/152 |
| 6,466,962 B2 | * | 10/2002 | Bollella | 718/107 |
| 7,000,232 B2 | * | 2/2006 | Jones et al. | 718/102 |
| 7,152,223 B1 | * | 12/2006 | Brumme et al. | 717/116 |
| 7,191,440 B2 | * | 3/2007 | Cota-Robles et al. | 718/1 |
| 7,337,433 B2 | * | 2/2008 | Cyran et al. | 717/130 |
| 2004/0237072 A1 | * | 11/2004 | Gelissen | 717/139 |
| 2005/0251806 A1 | * | 11/2005 | Auslander et al. | 718/100 |
| 2006/0020936 A1 | * | 1/2006 | Wyatt | 717/162 |
| 2009/0044188 A1 | * | 2/2009 | Kanai et al. | 718/100 |

OTHER PUBLICATIONS

PCT Search Report PCT/US08/72565 mailed Nov. 5, 2008.

* cited by examiner

*Primary Examiner* — Isaac Tecklu
(74) *Attorney, Agent, or Firm* — Harris Beach, PLLC; Neal L. Slifkin

(57) ABSTRACT

A method of using co-routines to implement a function-like interface between a BASIC program and the points in the system where SIP and SDP data (for example) are to be modified. This co-routine interface is intuitive from the end-user's perspective, and both real-time efficient and flexible from the system designer's perspective, and is applied to provide user-customized SIP and SDP modifications in an easy-to-use way that gives the end-user great flexibility while protecting the system from the undesirable side-effects that could result from a tightly coupled co-routine interface.

17 Claims, 5 Drawing Sheets

US 8,239,829 B2

USER CO-ROUTINE INTERFACE FOR CUSTOMIZING SIP AND SDP PROTOCOLS

RELATED APPLICATIONS

This application claims the benefit of U.S. Provisional Application No. 60/964,027 filed Aug. 8, 2007.

FIELD OF THE INVENTION

The Present Invention relates to telecommunications systems. More particularly, the Present Invention relates to the use of co-routines in telecommunications systems.

BACKGROUND OF THE INVENTION

Today's telecommunications systems continue to grow in scope and complexity at a very rapid pace. One of the enablers of this growth is the availability of low cost memory and processing power, which has in turn fostered the development of a new generation of telecommunication protocols, like SIP (Session Initiation Protocol) and SDP (Session Description Protocol). These future-oriented protocols are ASCII (American Standard Code for Information Interchange)-based, extensible and more human readable than earlier protocols where machine efficiency at runtime was valued higher than programmer productivity.

These new protocols carry much more information about the telecommunications services they support than older protocols, and a great deal of flexibility in tailoring a system to specific applications arises from the ability to modify the data in the protocol messages in very specific ways. Since protocols like SIP and SDP are ASCII-based, the data lend themselves to modification by end-users, specifically the technicians responsible for network engineering and planning. In the past, the use of "complex, binary-based" protocols would have required engineering design by the manufacturer to implement such customization.

Some telecommunications systems have traditionally incorporated an optional, integrated BASIC (Beginner's All-purpose Symbolic Instruction Code) interpreter for special applications. As an independently running scheduled process within the system, a BASIC program could send and receive inter-process messages from a CTI (Computer-Telephony-Interface) element within the system to control call processing for specialized applications which might otherwise have required the use of an external host computer. Access was also provided from BASIC to some OS (Operating System) controls, which allowed the manufacturer to implement bug fixes to released software. These manufacturer-provided BASIC programs could relieve symptoms of some types of bugs until a new software package was released to correct the problem.

Since BASIC is an easy-to-use higher-level language especially well suited to processing strings of ASCII characters, it is natural to consider its use for implementing customized modification of SIP and SDP message data either by end-user technicians or by the manufacturer. An example of a useful modification would be in changing data within an SDP "offer" depending on the time-of-day in order to reduce network loading during high traffic periods. This works because the SDP protocol carries information related to the bit-rate required by a media session.

See FIG. 1. The method of interaction between a BASIC process 10 and other system processes 20 is one in which BASIC is an independently running process scheduled by the System Scheduler 5 and sending and receiving inter-process messages (IPMs) 30 to other elements of the system. Such a method is both awkward and inefficient when applied to applications such as telecommunications protocol processing. Any real-time system software 20 that needs to send information to a BASIC process 10 must send it an IPM 30 and then wait for a response, while still accepting other real-time event input.

The requirement to wait for a response while still accepting other event input arises from the fact that telecommunications systems must process data in real-time, and the response from BASIC could be delayed significantly if BASIC is running as an independently scheduled process. A more straightforward interface would allow BASIC to be invoked as a simple function call in-line at the exact points where its processing is desired. This would also avoid the processing overhead associated with scheduling and IPMs.

SUMMARY OF THE INVENTION

The Present Invention incorporates a method of using co-routines to implement a function-like interface between a BASIC program and the points in the system where SIP and SDP data (for example) are to be modified. This co-routine interface is intuitive from the end-user's perspective, and both real-time efficient and flexible from the system designer's perspective.

The Present Invention's method applies its co-routine interface to provide user-customized SIP and SDP modifications in an easy-to-use way that gives the end-user great flexibility while protecting the system from the undesirable side-effects that could result from a tightly coupled co-routine interface.

DETAILED DESCRIPTION OF THE PRESENT INVENTION

Co-Routines

Figure 1:
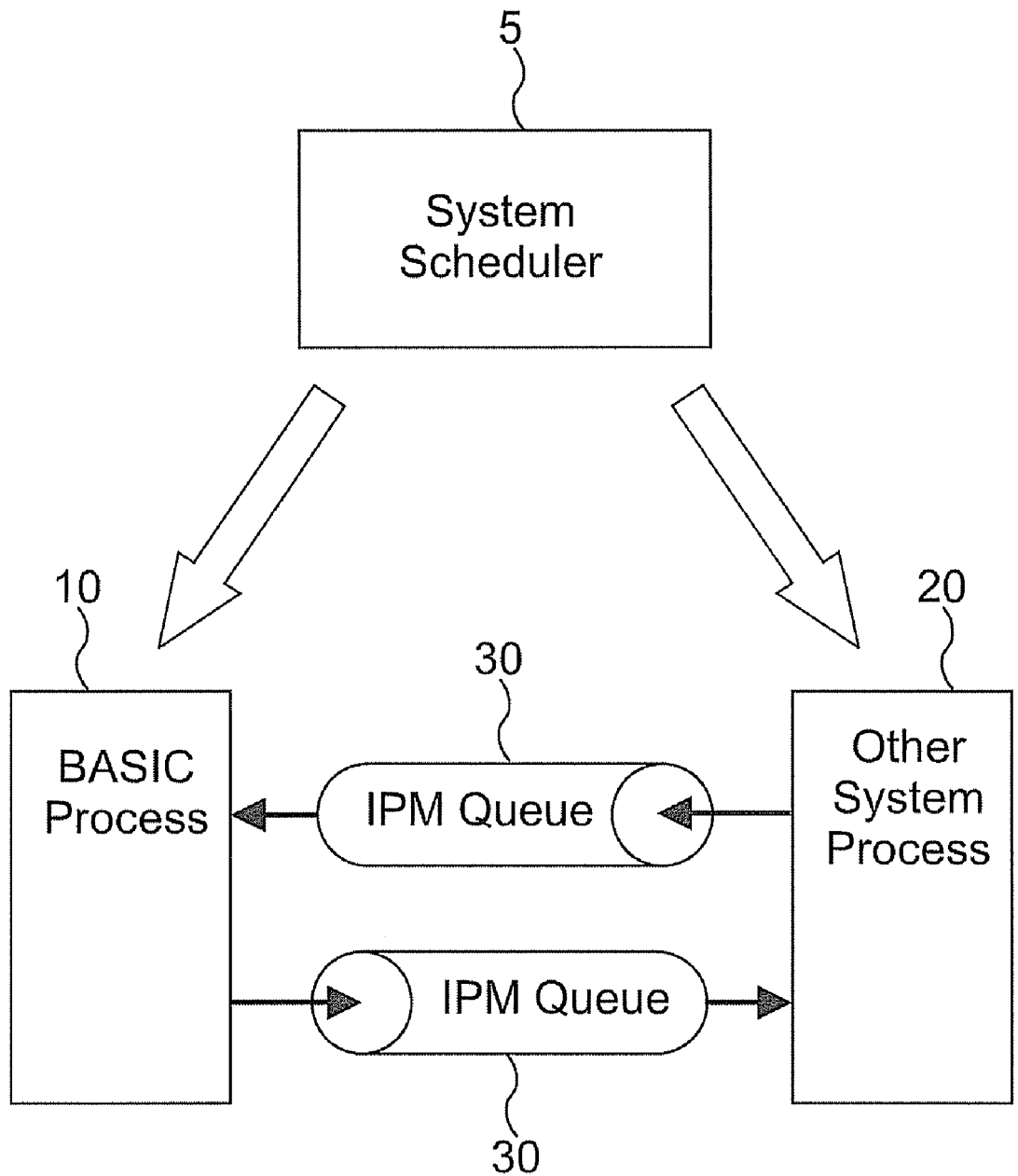
FIG. 1 shows the conventional method of communicating between a BASIC process and another process in a computer system.
Figure 2:
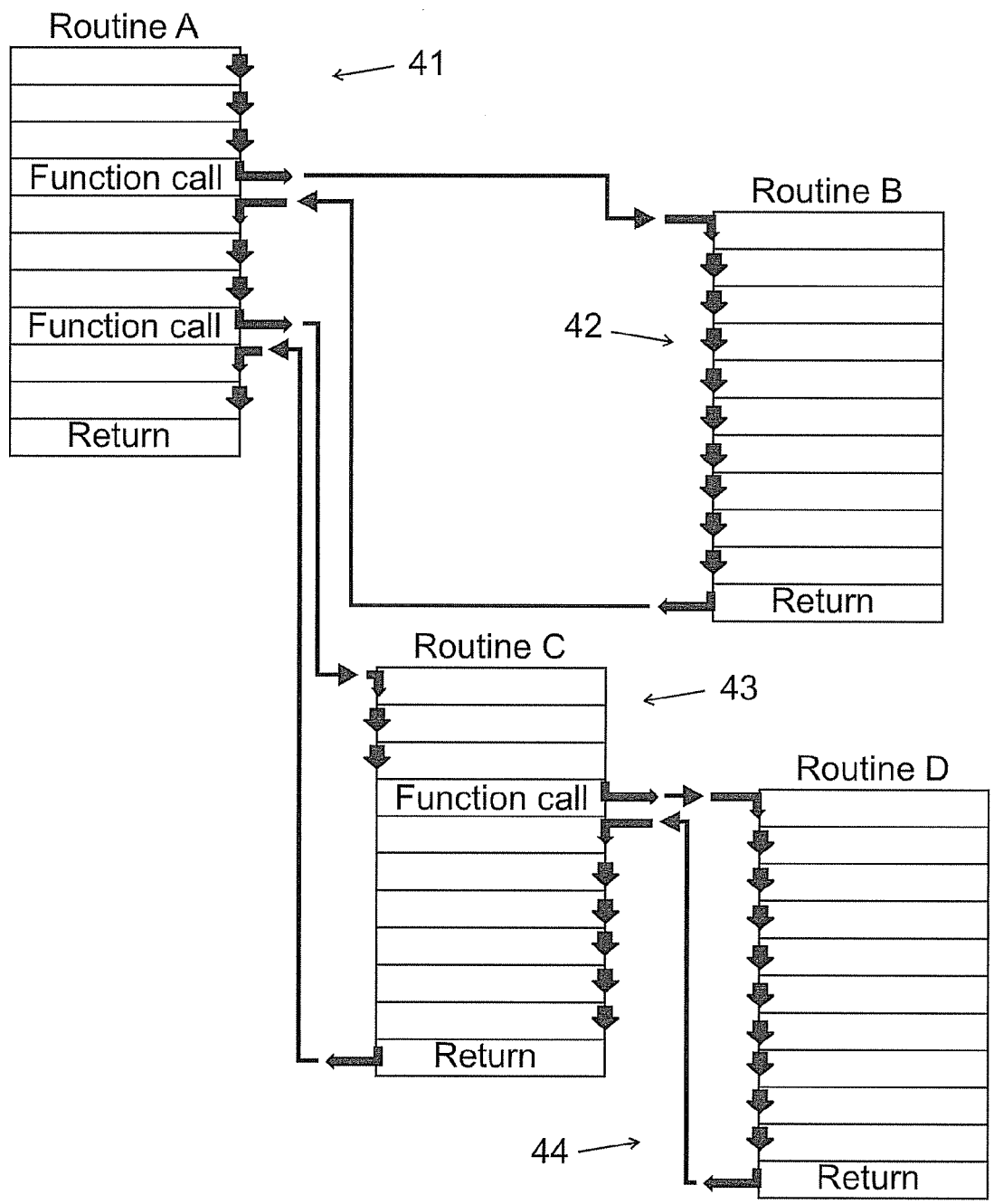
FIG. 2 shows a processing diagram of the conventional subroutine call mechanism.

Normally function calls are made in a hierarchical way (FIG. 2). The routine at the top of the hierarchy "A" 41 calls a routine "B" 42 lower in the hierarchy to perform some action. When "B" has completed, it returns to "A" at the point in "A" where "B" was called. Later, "A" may call "B" again. In addition, "B" may call a routine "C" 43 even lower in the hierarchy, but each lower routine called eventually completes its function and returns to its caller higher in the hierarchy.

Figure 3:
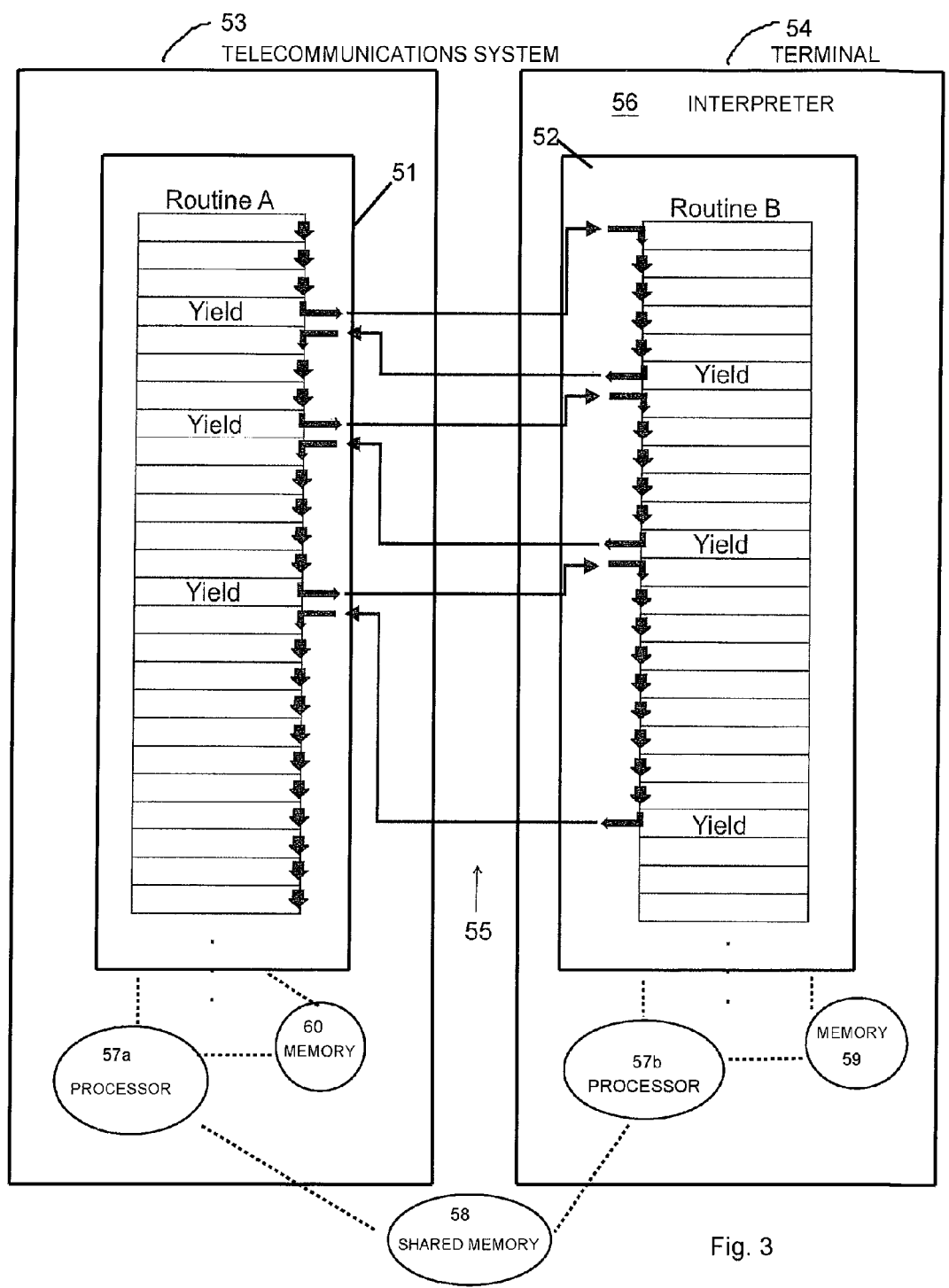
FIG. 3 shows a processing diagram of the co-routine call mechanism.

Co-routines are a generalization of the subroutine mechanism of FIG. 2 well-known in the art. See Donald Knuth, Fundamental Algorithms, Third Edition. Addison-Wesley, 1997. ISBN 0-201-89683-4. Section 1.4.2: Coroutines, pp. 193-200, and numerous other references in the computer science literature. In contrast to subroutines, co-routines are a special form of function call in which two routines "A" and "B" call each other in a completely symmetrical way (FIG. 3). The call from real-time program "A" 51 to non-real-time program "B" 52 resumes "B" from the point in "B" at which it last called "A". Then when "B" calls "A", "A" resumes from the point in "A" at which it last called "B". These special forms of function call are often called "yields" rather than "calls", with "A" yielding to "B" and vice-versa.

In the Present Invention, the roles of routines "A" 51 and "B" 52 in FIG. 3 are played by the call processing software of a telecommunications system 53 and the BASIC program, respectively. It can be seen from FIG. 3 that indeed there is a very close relationship between routine "A" and routine "B".

Traditionally, the co-routine concept has had somewhat limited application, usually in "co-operative multitasking" systems such as Apple's original Operating System (OS) for the Macintosh™ computer. In these types of applications, it is customary for both routine "A" and routine "B" to be provided by the system programmers, again due to the highly interactive and close relationship between the routines. In contrast, the present invention incorporates a method by which routine "A" is provided by the manufacturer of the telecommunications system 53 as an integral part of the product, but routine "B" (the BASIC program) is written separately and at a later time, possibly by the customer's technician responsible for network engineering and planning. This BASIC program is then loaded and run in the same manner as any other BASIC program, but becomes coupled to the system 53 via the invention's co-routine interface in order to provide the tailoring services described earlier.

One of the goals of the Present Invention is to teach a method by which this coupling of two disparate programming environments into a working co-routine relationship is accomplished.

The programming environment normally provided by a BASIC interpreter is highly interactive from the user's perspective, especially during the program development phase. The user (a programmer in this case) can enter program statements, execute either the entire program or smaller segments of it, examine intermediate results, make corrections and try again. Eventually a complete, presumably bug-free BASIC program results. All during this process there is a continual interplay between the programmer and BASIC. The programmer enters data on a terminal 54; BASIC responds with terminal output and possibly error messages.

But when a BASIC program takes on the role of routine "B" in the co-routine interface described above, it must not be allowed to prompt for sensitive non-real-time subcomponents, such as terminal input, issue error messages and await user response, or execute any function that would stall its execution. When called as a co-routine from system software in a real-time environment, the BASIC program 52 must essentially be limited to pure computation. For example, if a BASIC program included an INPUT statement and were executed as a co-routine from a real-time system process, that real-time process would cease execution at that point as it awaited terminal input to satisfy the INPUT statement. Cessation of execution of a real-time process responsible for handling events in a timely fashion would lead to system failure.

It is therefore another goal of the Present Invention to teach a method by which the environment of the BASIC program can be altered when it is used as a co-routine to prevent these dangerous side effects.

The BASIC Interpreter

In a preferred embodiment, a BASIC interpreter 56 is assumed as the programming environment in which routine "B" is written, but not the environment in which it is executed. Ultimately both routine "A" and routine "B" operate in the form of machine code running on a processor 57a, and a processor 57b, respectively. Routine "A" could have been written in the C programming language or another compiled programming language and then compiled and linked to become part of the telecommunications system 53 software provided by the manufacturer. Similarly, the BASIC interpreter 56 itself can be written in C or another compiled language. In both cases, portions of Routine "A" and the BASIC interpreter 56 preferably incorporate portions written in assembly language for speed and efficiency, since assembly language translates almost directly into machine language. It is necessary to describe briefly at a high level how a BASIC interpreter deals with a user's BASIC program. The detailed concepts behind compilers and interpreters are well known to the person of ordinary skill, and will not be addressed here.

In contrast to a compiler, the BASIC interpreter 56 does not convert the user's BASIC program into machine language and then execute that machine code later. Instead, the BASIC interpreter 56 reads the user's BASIC program as its data, and incrementally performs the actions called for by that data. The BASIC interpreter will preferably take steps to minimize processor overhead by internally representing the user's BASIC program in an abbreviated form organized so as to streamline execution. But the user's BASIC program just serves to cause the BASIC interpreter to select and execute the proper sequences of machine code already provided within the BASIC interpreter. For example, when an expression "X+Y" is encountered, the interpreter executes machine code to perform addition of the values assigned to the symbols X and Y. When a "PRINT" statement is encountered, the interpreter executes machine code to output data specified in the print statement to the terminal 54. The important point here is that from the perspective of the co-routine interface, routines "A" and "B" are just normal machine code.

In describing the Present Invention, it will be more convenient to describe the operation from the perspective of the writer of the BASIC program (the "B-writer") first, followed by the operation from the perspective of the writer of the system code (the "A-writer"). Following these descriptions, the detailed method of operation will be described. In the following descriptions, the term "context" refers to the program environment (processor state, machine registers, etc.) in force while a process executes. In FIG. 3, routine "A" has a context in which it executes and routine "B" has another context in which it executes. It is known to those of ordinary skill that a context must be established before any routine can execute.

Operation from B-Writer's Perspective

In the Preferred Embodiment, a BASIC program becomes registered as a co-routine for use by other system components by executing a special function call, YIELD_TO_SYSTEM (context), within the BASIC program, in which 'context' refers to the program environment in force during the BASIC program's execution at the point of the call. Here is an example BASIC program that demonstrates the use of this function and system variables used for passing arguments. This program works with the "C" program given later.

```
10    NEWLINE$=CHR$(10)
20    DETACH( )
30    REPEAT
40       YIELD_TO_SYSTEM(1)
50       HOUR$=LEFT(TIME$,2)
60       WO_ARG_1=0
70       IF HOUR$>="08" AND HOUR$<"17"
80          SDP$=RW_ARG_1$
90          POS1=INSTR(1,SDP$,"m=audio")
```

-continued

```
100     IF POS1
110        POS2=INSTR(POS1,SDP$,"RTP/AVP")
120        IF POS2
130           POS3=INSTR(POS2,SDP$," 0 ")
140           IF POS3=0 THEN
                 POS3=INSTR(POS2,SDP$,"0"+NEWLINE$)
150           IF POS3
160              SDP$=LEFT(SDP$,POS3-1)+RIGHT(SDP$,POS3+2)
170              WO__ARG__1=1
180           ENDIF
190           POS3=INSTR(POS2,SDP$," 8 ")
200           IF POS3=0 THEN
                 POS3=INSTR(POS2,SDP$,"8"+NEWLINE$)
210           IF POS3
220              SDP$=LEFT(SDP$,POS3-1)+RIGHT(SDP$,POS3+2)
230              WO__ARG__1=1
240           ENDIF
250           RW__ARG__1$=SDP$
260        ENDIF
270     ENDIF
280     ENDIF
290  UNTIL 0
```

A detailed, line-by-line explanation of this program will be given later. At this point, only an overview will be given to cover the most important concepts.

The statement at line 20 detaches the BASIC program to free up the terminal 54 from which the BASIC program was run. If this were not done, the terminal would be rendered unusable later when the BASIC program becomes registered as a co-routine. Until the YIELD_TO_SYSTEM(1) statement is executed, the BASIC program can perform any type of computation that may be desired.

When YIELD_TO_SYSTEM (1) at line 40 is first called, there is no previous context to yield to, so co-routine initialization is performed. The current BASIC program context is saved as context 1 (the argument to YIELD_TO_SYSTEM ( )), and then certain modifications are made to that context, according to the Present Invention, to prevent undesirable or dangerous side effects, e.g., sensitive non-real-time subcomponents from occurring when BASIC is later yielded to as a co-routine. As described earlier, these modifications are needed because when the BASIC program is yielded to later as a co-routine from another system process (routine "A" in FIG. 3), the BASIC program is really still executing as part of that process, not as BASIC.

The modifications made to the sensitive non-real-time subcomponents according to the Present Invention are:
  Any and all terminal output from PRINT statements or error messages is ignored and does not appear.
  Any attempt to read terminal input from INPUT statements or as a result of having returned to BASIC's prompt results in an immediate exit from BASIC, and control yields back to the calling system process.
  Execution of the BYE statement (used to terminate BASIC programs in the preferred embodiment) results in an immediate exit from BASIC, and control yields back to the calling system process.
  Any other special application-oriented functions that may have undesirable side effects are disabled and result in a trappable error if executed.

Again, the goal of these context modifications is to prevent the system process that will invoke BASIC as a co-routine from either waiting on a resource or performing undesirable actions while in the BASIC co-routine. The co-routine is supposed to be performing "pure computation".

Note that prior to the execution of the first YIELD_TO_SYSTEM( ), the BASIC program is free to do anything it normally could do; the context modifications which limit its access to the system only take effect after YIELD_TO_SYSTEM( ) is executed the first time.

After this initialization process has been completed, BASIC sets a flag to indicate to any potential user (routine "A") that co-routine context 1 (in this example) is available for use. After the co-routine interface has been initialized, the BASIC process enters a dormant state until it receives a signal that either a fatal error has occurred within the BASIC program while it was executing as a co-routine, or the program has been requested to exit explicitly. In the Preferred Embodiment this signal is an Operating System event, but any suitable signaling means could be employed. The BASIC process must enter this dormant state to prevent any subsequent modification to its saved context prior to its being yielded to as a co-routine.

Thus when system software later yields to BASIC through the co-routine interface, the context of the BASIC program will be exactly what it was when the YIELD_TO_SYSTEM (1) statement was first executed and the BASIC program will resume execution seamlessly from that point as a co-routine. To the rest of the system (specifically the system scheduler), the system software that yielded to BASIC as a co-routine is simply executing a function call within its own process, and the original BASIC process remains in a dormant state. This is the key concept in the Present Invention.

When the system software (routine "A") yields to the BASIC co-routine, the BASIC program will appear to "return" from the YIELD_TO_SYSTEM( ) function call at line 40. The program can then access any arguments passed to it as described below under "passing arguments" and perform any computations desired. Results would then be returned. Typically the program would then loop back to the same YIELD_TO_SYSTEM( ) function call, but this is not required. This is what happens in the example because the "REPEAT" statement at line 30 and the "UNTIL 0" statement at line 290 constitute an endless loop construct. As soon as a YIELD_TO_SYSTEM( ) function call is executed again, BASIC's context at that point (routine "B") is saved and control is yielded back to the system software (routine "A") at the point where it had previously yielded to BASIC. Again, this is shown in FIG. 3.

A person of ordinary skill in the art will realize that there are effectively an unlimited number of possible BASIC programs that could be written to take the place of the one shown above. The example is meant only to demonstrate the principles involved and should not be taken in a limiting way.

Passing Arguments

In order for the BASIC program to perform some useful data processing, there must obviously be a mechanism for passing arguments back and forth from routine "A" to routine "B". This can be done by designating a shared memory area 58 in which several variables are defined. Routine "A" can store appropriate values into the variables and routine "B" can then retrieve them. Similarly routine "B" can store results into the variables and routine "A" can then retrieve those results. In the Preferred Embodiment, the BASIC interpreter 56 supports the concept of read-only variables, write-only variables and read-write variables. By convention routine "A" will store application-specific values into certain variables which the "B writer" can use as inputs. Using the same read-write variable for passing input and returning results has the advantage that if no change to the input is required, then the correct, unaltered value is returned automatically.

Detailed Description of the Above BASIC Program

The example BASIC program given above is now described in detail. Although this program exemplifies a particular use of the capability taught by the Present Invention, many other examples of data manipulation by a BASIC program invoked through this co-routine interface will occur to the person of ordinary skill. Accordingly, this example should not be taken as limiting.

At line 10 the program sets a variable NEWLINE$ to a string containing a newline character (ASCII 20). This is used later. At line 20 the program calls a function to detach the program from the terminal 54 on which it was initiated to prevent the terminal from being rendered unusable when the program later becomes registered as a co-routine. Line 30 defines an endless looping structure which extends from line 30 down to line 290. Line 40 causes BASIC to perform the context modifications described in detail earlier (first time only), and then yield back to the system and await a subsequent invocation from the system as a co-routine. When the system needs to invoke the BASIC program, it will set up certain input parameters, and then yield back to BASIC. This will cause the BASIC program to resume execution at line 50.

At this point it is useful to restate the purpose of this example BASIC program. The system administrator wishes to process SDP offers for calls made during high traffic periods (e.g. during the time period from 08:00 through 16:59) so that fewer network resources are required for these calls. Specifically, the administrator wishes to change data within the SDP offer to delete certain codec (coder/decoder) choices presented in the SDP during the hours of 08:00 through 16:59. This amounts to deleting a "0" and/or an "8" from the SDP data at the required places in the data for calls made during that time period.

At line 50 the BASIC program calls a function LEFT (TIME$,2). The variable TIME$ is a system variable returning the current wall time as a string (e.g. "09:23:50"). The LEFT function extracts the left 2 characters of this string as the HOUR$ variable. At line 60, the system variable WO_ARG__1 is set to zero. This variable by convention is one of the return values passed back from BASIC to the system. Setting it to 0 indicates that the program has not performed the SDP manipulation. If not later set to a non-zero value, this will be returned to the system as a status response. At line 70 a check is made to determine if the current wall time is between 08:00 and 16:59, the hours during which the SDP manipulation is to occur. If not within the required time period, the statement will evaluate to a false result and control will skip down to line 280, and from there to line 290. The UNTIL 0 statement at line 290 will always evaluate to a false condition (0 is considered false), so control will be returned back to line 30, and then on to line 40 where BASIC will again yield back to the system. Since no SDP manipulation occurred, the call will proceed with the original SDP offer.

However, if at line 70 the current wall time is within the 08:00 to 16:59 time period, the IF statement will evaluate to a true result and control will be passed to line 80. At line 80 a variable SDP$ is set to RW_ARG__1$. The variable RW_ARG__1$ is by convention one of the input arguments passed by the system to BASIC when the co-routine is invoked. It represents the original SDP offer data. Being a read-write variable, it may be changed by the BASIC program and returned as a result back to the system, and this is exactly what will occur in this case. The data stored in the SDP$ variable at line 80 would appear as follows if printed to a terminal:

```
v=0
o=root 1270583700 1270583700 IN IP4 192.168.42.59
s=call
```

-continued

```
c=IN IP4 192.168.42.59
t=0 0
m=audio 58520 RTP/AVP 0 8 9 2 3 18 4 101
a=rtpmap:0 pcmu/8000
a=rtpmap:8 pcma/8000
a=rtpmap:9 g722/8000
a=rtpmap:2 g726-32/8000
a=rtpmap:3 gsm/8000
a=rtpmap:18 g729/8000
a=rtpmap:4 g723/8000
a=rtpmap:101 telephone-event/8000
a=fmtp:101 0-16
a=ptime:20
a=sendrecv
```

Each line in the above is ended with an ASCII 10 (newline) character. At line 90 the INSTR function searches the string for the text "m=audio", and sets POS1 to the character position within the string at which it was found. Line 100 checks that INSTR found the string (INSTR returns 0 if the string was not found). If "m=audio" was not found within the SDP, then POS1 will be zero and control skips down to line 270 and eventually back to line 40 as before. If the string "m=audio" is found however, then we move on to line 110 and try to find a string "RTP/AVP" in the SDP offer. Again if this is not found, POS2 will be zero and at line 120 we skip to line 260 and then back to line 40. But if "RTP/AVP" is found, then we drop into line 130 where we look for a "0" string. In the example SDP shown above, this will be found as the bold-faced "0". Since the rules for SDP permit this value to occur even at the end of the line (where the value "101" is placed in the example), we also have to check for a "0" followed by the newline character that terminates each line of an SDP offer. This is checked for at line 140. Line 150 checks if we found the "0" by either method, and if so, line 160 creates new SDP offer text by concatenating the left portion of the original SDP (LEFT function) up to just before the "0" with the right portion of the original SDP (RIGHT function) starting just beyond the "0" This has the effect of deleting the "0" from the SDP offer. Similarly lines 190 through 240 delete an "8" from the SDP offer. In both cases, lines 170 and 230 set the return status system variable to 1 to indicate to the system that SDP manipulation was successful. Finally, at line 250 the new SDP offer is stored back into the read-write variable RW_ARG__1$ to be passed back to the system. Then control returns again to line 40, and BASIC yields back to the system. System software (routine "A") will now proceed with an SDP offer that may have been modified by the BASIC program (routine "B").

Multiple Co-Routine Contexts

The above example uses YIELD_TO_SYSTEM (1). There can be more than one active co-routine context. If for example system software is coded by convention to use context 1 for SDP data modifications, then the BASIC program to process this as a co-routine would use YIELD_TO_SYSTEM (1). There could be another independent process (e.g. SIP modification or a debugger) coded to use context 2. Another BASIC program would be running which used YIELD_TO_SYSTEM(2) for these services.

Operation from "A-Writer's" Perspective

We will assume that the "A-writer" is writing system software (routine "A") in the C programming language that is then compiled and linked to become part of the telecommunications system software provided by the manufacturer, as mentioned earlier. At a point in this code where it is appropriate to invoke the BASIC co-routine (routine "B"), several steps are taken as shown in the code fragment given below, but the process is actually nothing more than a straightforward function call:

```
char sdp_data[MAX_SDP_DATA_STRING_LENGTH];
/* code to set up sdp data string */
/*
* The context index is set to 1 to agree with the
YIELD_TO_SYSTEM( 1 )
* statement in the BASIC program.
*
*/
context_index = 1;
/*
* First be sure that the co-routine interface is inited.
*
*/
if ( bas_coroutine_data[ context_index ].bas_context {
    bas_coroutine_data[ context_index].rw.str_arg.ptr = sdp_data;
    bas_coroutine_data[ context_index].rw.str_arg.max_len =
MAX_SDP_DATA_STRING_LENGTH;
    bas_coroutine_data[ context_index].wo.int_arg = TRUE; /* in
    case BASIC does not set it */
    /* Must set job.context to a non-zero value to indicate that we
    are not initing. */
    bas_coroutine_data[ context_index].job_context = 1;
    bas_context_swap ( &bas_coroutine_data[
context_index ].job_context, &bas_coroutine_data[
context_index ].bas_context);
    if ( bas_coroutine_data[ context_index ].wo.int_arg == 1 ) {
        /* BASIC program was successful */
    } else {
        /* BASIC program was unsuccessful */
    }
}
/* code to use possibly modified sdp data string */
```

Detailed Description of the Above "C" Code Fragment

The above code fragment is quite straightforward. The first "if" statement checks a data structure variable to see if the context is available. If the BASIC program has not yet been run and executed its YIELD_TO_SYSTEM( ) function, then this variable will still be zero, and no call will be made to the BASIC program. If the BASIC program has initialized the co-routine interface, then this variable will not be zero, and the body of the "if" will be executed.

"context index" is set to 1 to agree with the argument used in the YIELD_TO_SYSTEM( ) function call made from BASIC. There could be another BASIC co-routine running, along with another "C" program using it, and this second pair of programs would by convention agree to use a different "context index" value (e.g. 2).

The next statements set up the input argument "rw.str_arg" to a pointer to the SDP string ("sdp_data") which the BASIC program is to modify. Since this is a read-write variable to BASIC, the "max_len" variable is set to indicate to BASIC how much memory is available when storing into that string. This prevents BASIC from writing beyond the memory allocated for this string. The next statement initializes the return status value so that it will default to TRUE if the BASIC program does not set the value for some reason.

The "job_context" variable is then set to any non-zero value ("1" in-the example). This indicates to the bas_context_swap( ) function about to be called that we are not calling it for the first time (when co-routine initialization would be done), but rather that we simply wish to perform the context swap with the already running BASIC co-routine. (When the BASIC program executed its YIELD_TO_SYSTEM( ) function call, bas_context_swap( ) was also called, but the "job_context" variable was zero the first time, so co-routine initialization was performed as discussed earlier.)

The bas_context_swap( ) function is now called. This performs the context swap which yields to BASIC at the statement following the last executed YIELD_TO_SYSTEM( ) statement. BASIC fetches the arguments, does its processing, and stores its results in system variables.

When the BASIC program executes either the same or another YIELD_TO_SYSTEM( ) statement, control is yielded back to this C-language code fragment and the call to bas_context_swap( ) returns. This C code fragment can then pick up any results from the system variables. The next "if" statement checks one of these variables ("wo.int_arg") which by convention is used to indicate whether the BASIC program was successful in its work. The variable "sdp_data", possibly modified by the BASIC program, is now available for further user by the C code fragment.

Correspondence Between Basic and "C" Co-Routine Arguments

The following table shows the relationship between the structure elements in the example C code fragment and the example BASIC program:

| C Structure Element | BASIC System Variable | Notes |
| --- | --- | --- |
| bas_coroutine_data [ i ].rw.str_arg.ptr | RW_ARG_1$ | 1 |
| bas_coroutine_data[ i ].wo.int_arg | WO_ARG_1 | 2 |

Notes:
1 This string variable argument can be read or written by either job.
2 This integer argument can only be written by BASIC.

Performing the Context Swap

We have discussed the co-routine principle, the steps to be taken in initializing the interface and specific examples of a BASIC program and a C code fragment operating in a co-routine relationship. We now describe the actual routine which performs the co-routine context swap, passing control between the C and BASIC co-routines. This is the common code which is called when BASIC calls the YIELD_TO_SYSTEM( ) function or when the C code fragment calls the bas_context_swap( ) function.

Figure 4:
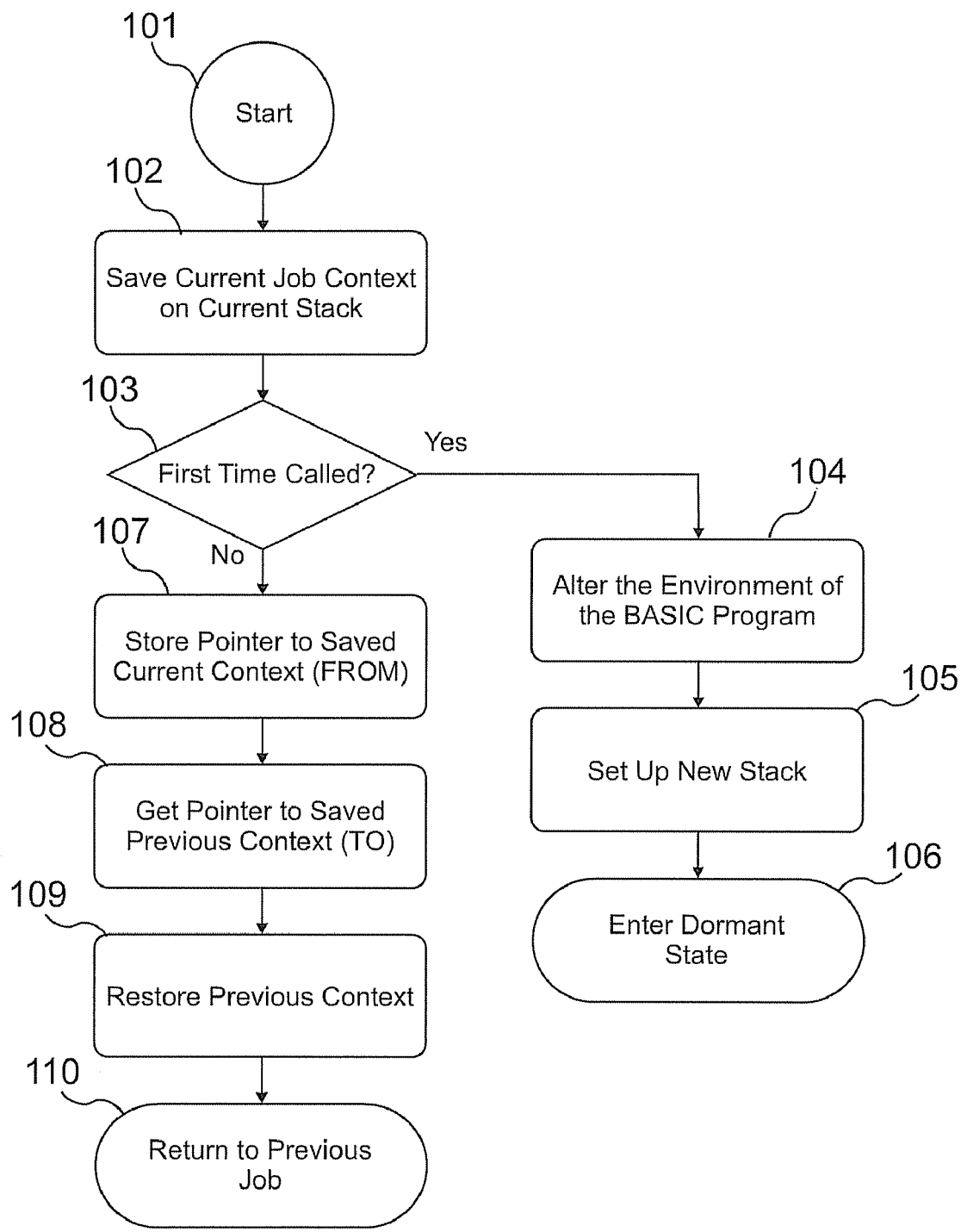
FIG. 4 shows a flow diagram of the invention's context-management processing.

Because this code must save the entire program context including machine registers and preserve the program's stack (an area of memory accessed in a last-in-first-out manner and not directly accessible to higher level languages), this code must normally be written in machine language. In order to better explain the context swapping code, a flow diagram will be given in FIG. 4, followed by an explanation of that flow diagram.

As mentioned, this common code is called both from BASIC when the YIELD_TO_SYSTEM( ) function is called, and from the C code fragment when the bas_context_swap( ) function is called. The first time this code is called is when the BASIC program running in the BASIC process first calls YIELD_TO_SYSTEM( ) See FIG. 4. Processing starts at 101. At 102 all required job context information is stored on the current job's (BASIC's) stack 59 (FIG. 3). The stack 59, as mentioned above, contains many job context items already stored during the normal operation of the current job (BASIC), but this additional information includes machine registers and other information not normally stored. In total, this information contains everything required to resume the program later. At 103 a check is made to see if this is the first time this code has been called. It will be the first time, so we continue at 104. At step 104, the environment of the BASIC program just saved is altered to prevent dangerous side effects when the BASIC program is later invoked as a co-routine, as mentioned before. This process will be explained in more detail later. At 105 a new stack area is set up for the BASIC program so that it may safely enter a dormant state at 106 without disturbing the saved context in any way. This is important since the saved context will be restored later and correct operation as a co-routine will be impossible if the restored context is not exactly the same. The original BASIC process is now in a dormant state and never advances from this point.

Now the C code fragment calls this code by executing the bas_context_swap( ) function. Again we start at 101. Although we will be executing the exact same code, this call came from the system process which contained the C code fragment, and not from the BASIC process. At 102 all required job context information is stored on the current job's stack 60, but this time it will be the stack and context of the system process containing the C code fragment. The check at 103 will determine that this is not the first time called, so we will continue at 107. A pointer to the current context is saved in a memory area 58 accessible to both BASIC and the C code fragment as the FROM pointer (meaning the context we are about to leave). At 108 the pointer to the previously saved context is fetched as the TO pointer (meaning the context we are about to enter). At 109 the previous context is restored. This will be the context that was saved when BASIC called this code earlier. At 110 this code will return. A normal hierarchical function would return to the program that called it as shown in FIG. 2. However, the context swapping results in this code acting as a co-routine as shown in FIG. 3. Therefore at 110, control is returned to the BASIC co-routine whose context was saved earlier. This code was called from C, but returned to BASIC.

The BASIC program is now running, and at some point it will call the YIELD_TO_SYSTEM( ) function. Again this code will be called at 101. Again at 102 the current context will be saved (this time BASIC's context), and again at 103 control will be passed to 107 storing the current context pointer, and the saved context of the C code fragment will be restored at 108 and 109. At 110 we will return, but again not to the caller, but as in FIG. 3 to the C code fragment. This time this code was called from BASIC, but returned to C. In fact, in FIG. 3, the solid arrows 55 linking the left routine "A" with the right routine "B" are nothing more than the calls to this context swapping code, with the C code fragment playing the role of routine "A" and the BASIC program playing the role of routine "B".

Altering the Environment of the BASIC Program

Figure 5:
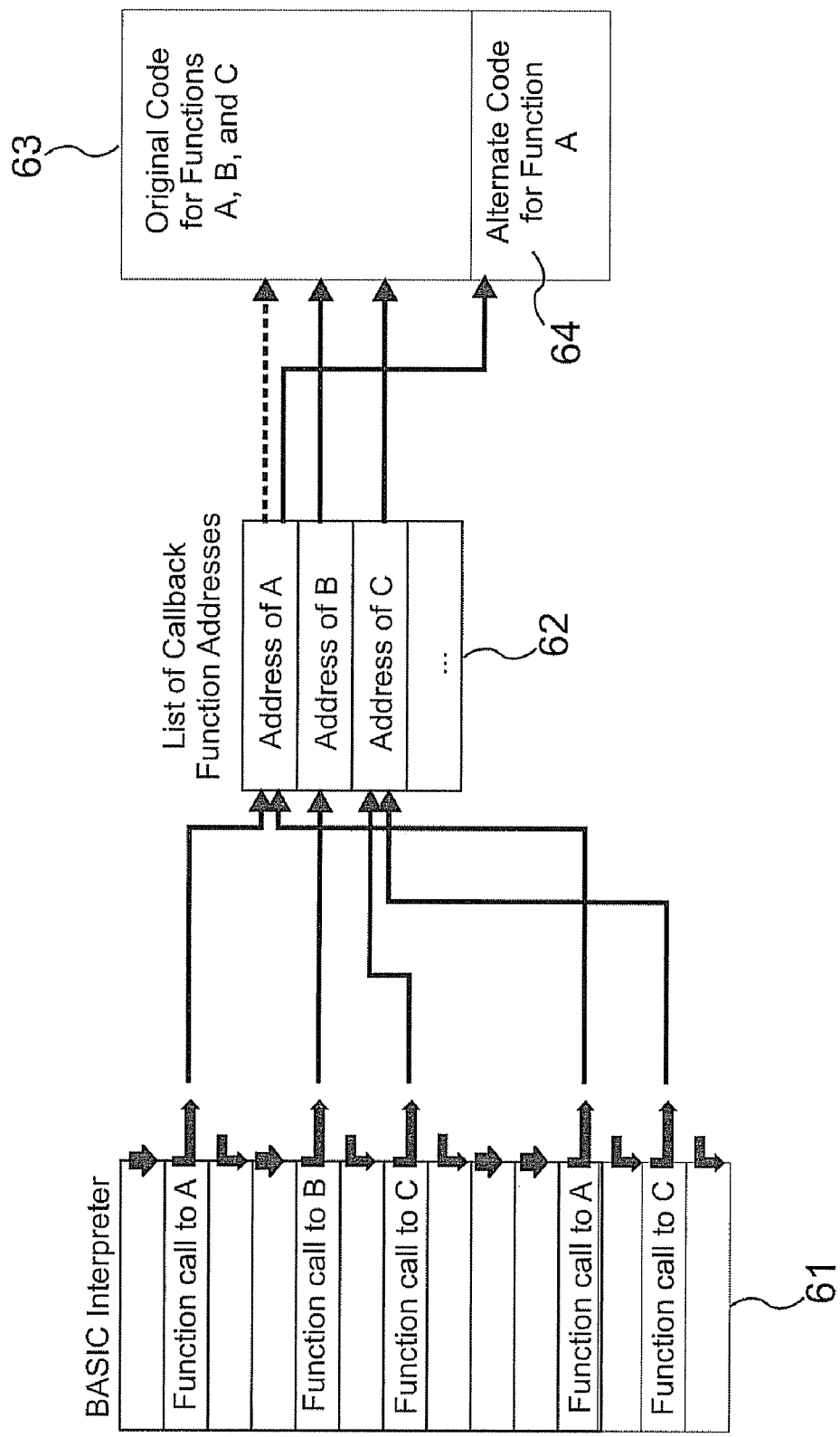
FIG. 5 shows a processing diagram of the invention's call-back method.

It was mentioned earlier that another goal of the Present Invention is to teach a method by which the environment of the BASIC program can be altered when it is used as a co-routine to prevent dangerous side effects. This environment amounts to the set of functions that the BASIC interpreter 56 calls to perform input/output and to access system resources. In the Preferred Embodiment, access to all of these functions is indirect, using what are known as "callback functions". When the BASIC interpreter 56 is first invoked, it is passed a list of the addresses of the functions that BASIC is to use for input/output and access to system resources ("List of Callback Function Addresses" 62 in FIG. 5). BASIC then calls these functions in an indirect manner by obtaining the address of the required function from this list, and then calling it (FIG. 5). The alternative would be simply to call the function directly in the normal way as shown in FIG. 2.

One advantage of using callback functions is platform independence since the BASIC interpreter 56 is not tied into the specifics of the input/output and system interface requirements of a platform, and can thereby remain "pure code" dealing exclusively with the BASIC language itself. But in the Present Invention, the use of callback functions also provides a very flexible and efficient means for altering the environment of the BASIC program when running as a co-routine. When the co-routine is first accessed and YIELD_TO_SYSTEM( ) is first called, the context-swapping code 104 in FIG. 4 modifies this list of callback functions, substituting new function addresses for those deemed dangerous when executing as a co-routine. This is a flexible method since only specific functions need be substituted. It is also efficient since substitution of one address automatically covers all calls to that function within BASIC. For example in FIG. 5, if the original function "A" in 63 is the function which handles terminal input and it is desired to disable this function when in a co-routine, then the entry "Address of A" in 62 can be altered so that it contains the address of another function 64 which does not perform terminal input, but perhaps reports an error. Once this substitution is performed, all "Function Calls to A" from the BASIC Interpreter 56 (there are two calls to function "A" shown in FIG. 5) will automatically start using the new function ("Alternate Code for Function A").

If this method of substituting callback functions were not used, then at every point within the BASIC interpreter where a potentially dangerous function call is made, code would have to exist to check which function to call at that point (the original or the new). This checking would incur processor overhead at run-time, unacceptable in real-time systems, and would be error-prone, since each occurrence of a function call would have to be handled individually. Substitution of callback addresses needs to be done only once, when the co-routine interface is first initialized.

We claim:

1. A method for managing data in a real-time computer system, comprising:

providing a real-time program in the real-time computer system comprising one or more real-time components and subcomponents;

providing a non-real-time program in a non-real-time computer system for use as a co-routine with the real-time program in the real-time computer system, the non-real-time program comprising one or more non-real-time data management components and subcomponents;

providing a context-swapping software component of the real-time computer system to switch contexts between a real-time software component of the real-time program and a non-real-time software component of the non-real-time program;

identifying sensitive non-real-time subcomponents of each non-real-time data management software component which cannot be used as subcomponents of the real-time program;

replacing the sensitive non-real-time subcomponents with real-time environment protection subcomponents for use as a subcomponent of the real-time program; and executing the real-time program in a real-time environment; and wherein during execution of the real-time program, the real-time program yields to the non-real-time program and the context-swapping software component enables execution of the non-real-time program in the real-time program environment wherein replacing the sensitive non-real-time subcomponents with real-time environment protection subcomponents comprises using a callback table to replace each sensitive non-real-time subcomponent with a real-time environment protection subcomponent.

2. The method of claim 1, wherein during the execution step, the real-time program is not stopped, paused, or suspended.

3. The method of claim 1, wherein the non-real-time program is written in a language and environment that is different from the real-time language and environment.

4. The method of claim 3, wherein the real-time program is written and executed using a compiled language and its environment, and the non-real-time program is written in an interpreted language and its environment.

5. The method of claim 4, wherein the interpreted language and its environment of the non-real-time program is selected from the group consisting of:
the BASIC language and its interpreter;
the Python language and its interpreter;
the Ruby language and its interpreter;
the Java language and its interpreter; and
the JavaScript language and its interpreter.

6. The method of claim 1, wherein the compiled language and its environment of the real-time program is selected from the group consisting of:
the C language and its compiler;
the C++ language and its compiler;
the C# language and its compiler.

7. The method of claim 1, wherein real-time program is written and executed using a computer-system-dependent assembly language and its environment.

8. The method of claim 1, wherein during execution of the real-time program, the non-real-time program yields to the real-time program and the context-swapping software component enables normal execution of the real-time program.

9. A computer program product for managing data in a real-time computer system that is coupled to a non-real-time computer system, the computer program product comprising:
a first computer readable memory coupled to the real-time computer system;
a second computer readable memory coupled to the non-real-time computer system;
real-time program instructions stored on the first computer readable memory;
non-real time program instructions stored on the second computer readable memory to identify sensitive non-real-time subcomponents which cannot be used as subcomponents of the real-time program instructions and replace the sensitive non-real-time subcomponents with real-time environment protection subcomponents for use as a subcomponent of the real-time program instructions;
wherein the real-time program instructions yield to the non-real-time program instructions and execute the non-real-time program instructions in a real-time program environment wherein replacing the sensitive non-real-time subcomponents with real-time environment protection subcomponents comprises using a callback table to replace each sensitive non-real-time subcomponent with a real-time environment protection subcomponent.

10. The computer program product of claim 9, wherein the real-time program instructions include a context-swapping software component to execute context-swapping program instructions between the real-time computer system and the non-real-time computer system.

11. The computer program product of claim 9, wherein the non-real-time computer system further includes a shared memory area for passing arguments back and forth from the real-time program instructions to the non-real-time program instructions.

12. The computer program product of claim 11, wherein the shared memory area comprises a callback table.

13. The computer program product of claim 9, wherein the first computer readable memory comprises a stack.

14. The computer program product of claim 9, wherein the secondary computer readable memory comprises a stack.

15. The computer program product of claim 9, wherein the non-real-time program instructions yield to the real-time program instructions and execute the non-real-time program instructions in a real-time program environment.

16. The computer program product of claim 9, wherein the real-time computer system is a telecommunications system, and the real-time program instructions include Session Initiation Protocols and Session Description Protocols.

17. The computer program product of claim 9, wherein the non-real-time computer system comprises:
event handler;
associating a second reference to at least some of the monitoring wrapper function, subsequent to the first reference, with the event handler, the second reference comprising at least one set of instructions between the first reference and the second reference in the event handler; and
using at least some of the monitoring wrapper functions to collect information from an event invoked by the event generator, comprising:
recording the first state of the event generator prior to invocation of the event;
calling one or more event handler functions called by the event;
recording the second state of the event generator after completion of the event; and
passing the collected information to a recording engine a BASIC interpreter in which the non-real-time program instructions are written.

* * * * *

UNITED STATES PATENT AND TRADEMARK OFFICE
CERTIFICATE OF CORRECTION

| | | |
|---|---|---|
| PATENT NO. | : 8,239,829 B2 | Page 1 of 1 |
| APPLICATION NO. | : 12/188347 | |
| DATED | : August 7, 2012 | |
| INVENTOR(S) | : Charles J. Breidenstein et al. | |

It is certified that error appears in the above-identified patent and that said Letters Patent is hereby corrected as shown below:

On title page, item 75 Inventors,
replace "West Seneca, NY (US)"
with "Rochester, NY (US)."

Signed and Sealed this
Twenty-fifth Day of September, 2012

David J. Kappos
*Director of the United States Patent and Trademark Office*